UNITED STATES PATENT OFFICE.

CHARLES HAVARD, OF NEW YORK, N. Y.

IMPROVEMENT IN THE MANUFACTURE OF CANDLES FROM PARAFFINE.

Specification forming part of Letters Patent No. 50,000, dated September 19, 1865.

*To all whom it may concern:*

Be it known that I, CHARLES HAVARD, of the city, county, and State of New York, have invented a new and improved mode of converting the petroleum-paraffine into a suitable material for making candles, possessing the necessary qualities of such, as whiteness, hardness, and their being freedom from odor, or the casting of such suitable material into solid blocks for the making of candles, or using such blocks as may be applicable for other purposes; and I do declare that the following is a full and exact description thereof.

The nature of my invention is as follows: I put into a wooden or iron tank one thousand pounds (1,000 lbs.) of water, (except well-water,) mix with it one hundred pounds (100 lbs.) unslaked lime, stir the whole well, and when perfectly mixed I let it rest for about two (2) days until the lime has settled to the bottom of the tank. When so I draw off the clear water (which is now lime-water) and use it as hereinafter specified. I take five hundred pounds (500 lbs.) of the last-mentioned limewater, put it into a barrel, add to this five pounds (5 lbs.) of sulphuric acid, stir it well several times during the day, and repeat the stirring in the same way during three days, after which time this mixture of lime-water and sulphuric acid is ready for further use.

*Process No. 1.*—Then I take five hundred pounds (500 lbs.) of petroleum-paraffine, heat it in a tank lined with lead, with wet or dry steam, to about eighty (80) degrees Fahrenheit. When so heated I add under constant stirring (which can best be produced by a revolving shaft in and a lid over the tank) fifty pounds (50 lbs.) of above-named lime and sulphuric-acid water, raise the steam until the whole is boiling, and keep it boiling for fifteen (15) minutes. Then I turn off the steam and let the whole rest until perfectly clear. When so I let this mixture run into square tin pans of the size and capacity of four pounds (4 lbs.) each, (made so that the cake or piece, when hard, will not be thicker than ($\frac{1}{2}$) half an inch,) leave it to cool and harden. When hard I take it out of the pans, place each cake or piece into a strong woolen bag of the same size and shape, and place this again into a strong linen bag of same size and shape. When done I place it under hydraulic pressure of about three hundred (300) tons, and press it until no more oil or liquid can be extracted. When thus pressed I take the compound out of the bags and take of it—

*Process No. 2.*—Three hundred pounds, (300 lbs.,) place it into a tank lined with lead and heated by dry steam, turn on the steam until this compound is melted. When so I add under constant stirring four (4) gallons of white naphtha of a gravity of seventy to seventy-five degrees, raise the steam so that this whole mixture will be heated to about eighty (80) degrees Fahrenheit. When so heated I turn off the steam and let the whole rest for about fifteen (15) minutes. Then I let it run into square tin pans, and proceed with the same pressing operation as in the Process No. 1, using, instead of three hundred (300) tons pressure, now eight hundred (800) tons pressure, and press it until no more liquid can be extracted. Then I take it all out of the bags—

*Process No. 3.*—Melt all of it, and repeat all and everything named in Process No. 2. When the pressing is finished I take all out of the bags—

*Process No. 4.*—Place it into a tank lined with lead, and raise the heat of the compound by dry steam to about sixty (60) degrees Fahrenheit, and keep it at that degree of heat. Then I add under constant stirring five per cent (5%) of powdered animal-charcoal, continue the stirring until all is well combined. Then I add four per cent. (4%) of common chalk, whitening, or pipe-clay, resume the stirring until this is again well mixed. Then I add, resuming the stirring, ten per centum (10%) of caustic soda-lye of a gravity of two per cent. (2%) by Baumé's hydrometer, let the whole mix well, and boil for five (5) minutes. Then I turn off the steam and let all stand until the animal-charcoal, chalk, whitening, or pipe-clay has settled to the bottom of the tank. When clear, this composition will be of a beautiful white, and can, by addition of suitable colors, be colored to any tint desired.

*Process No. 5.*—Then I let it run into a clean tank lined with lead and heated by dry steam, add under constant stirring twenty per cent. (20%) of stearic acid, or increase the quantum of stearine as the candle shall be made more hard. I then raise the heat of this mixture to two hundred (200) degrees Fahrenheit. When done I heat common candle-molds, pour the ready compound into said molds, and when the matter has thickened I expose the molds, with contents, to an atmosphere of one (1) degree below freezing-point until the candle is hard. When so I take the candles out of the molds, and they are thus finished.

To make blocks, I let the last compound attain only eighty (80) degrees of heat, instead of two hundred, as named in Process No. 5, and let it run into pans of any size desired, and expose these pans with contents in like manner as the above-named molds to cool and harden.

Thus the process for making petroleum-candles or petroleum-paraffine blocks for the molding of candles or other purposes is finished and completed.

What I claim as my invention, and desire to secure by Letters Patent, is—

A new and improved process for making candles or blocks from the paraffine of petroleum, as herein described, using for that purpose the aforesaid ingredients or composition of matter or any other substantially the same and which will produce the intended effect.

C. HAVARD.

In presence of—
GEO. ENOCH,
ISAAC JACOBSOHN.